United States Patent [19]
Shimasaki et al.

[11] Patent Number: 5,857,325
[45] Date of Patent: Jan. 12, 1999

[54] ELECTRICAL LOAD ABNORMALITY-DETECTING SYSTEM FOR AUTOMOTIVE VEHICLES

[75] Inventors: Yuichi Shimasaki; Hiroaki Kato; Akihisa Saito; Tetsu Teshirogi; Hideo Furumoto; Takuya Aoki, all of Wako, Japan

[73] Assignee: Honda Giken Kogyo Kabushiki Kaisha, Tokyo, Japan

[21] Appl. No.: 697,499

[22] Filed: Aug. 26, 1996

[30] Foreign Application Priority Data

Aug. 25, 1995 [JP] Japan ................................. 7-238961

[51] Int. Cl.[6] .............................. F01N 3/20; F01N 3/30; H05B 1/02
[52] U.S. Cl. ................................ 60/284; 60/289; 219/497
[58] Field of Search ............................. 60/284, 286, 289; 315/297, 323; 324/522; 307/10.1, 31, 41; 318/102; 219/202, 482, 485, 497, 664, 671

[56] References Cited

U.S. PATENT DOCUMENTS

| | | | |
|---|---|---|---|
| 4,307,775 | 12/1981 | Saunders et al. | 219/485 |
| 5,257,501 | 11/1993 | Wataya | 60/284 |
| 5,337,013 | 8/1994 | Langer et al. | 307/10.1 |
| 5,340,964 | 8/1994 | Galloway et al. | 219/497 |
| 5,553,451 | 9/1996 | Harada | 60/284 |
| 5,689,952 | 11/1997 | Kato et al. | 60/284 |

*Primary Examiner*—Willis R. Wolfe
*Attorney, Agent, or Firm*—Nikaido Marmelstein Murray & Oram LLP

[57] ABSTRACT

An electrical load abnormality-detecting system for an automotive vehicle detects abnormality of each of a plurality of electrical load devices installed on the vehicle. A current sensor is provided commonly for the plurality of electrical load devices, for detecting a total load current flowing through the plurality of electrical load devices. The plurality of electrical load devices are separately put into operation, and abnormality of each of the plurality of electrical load devices is determined based on the total load current detected by the current sensor.

7 Claims, 4 Drawing Sheets

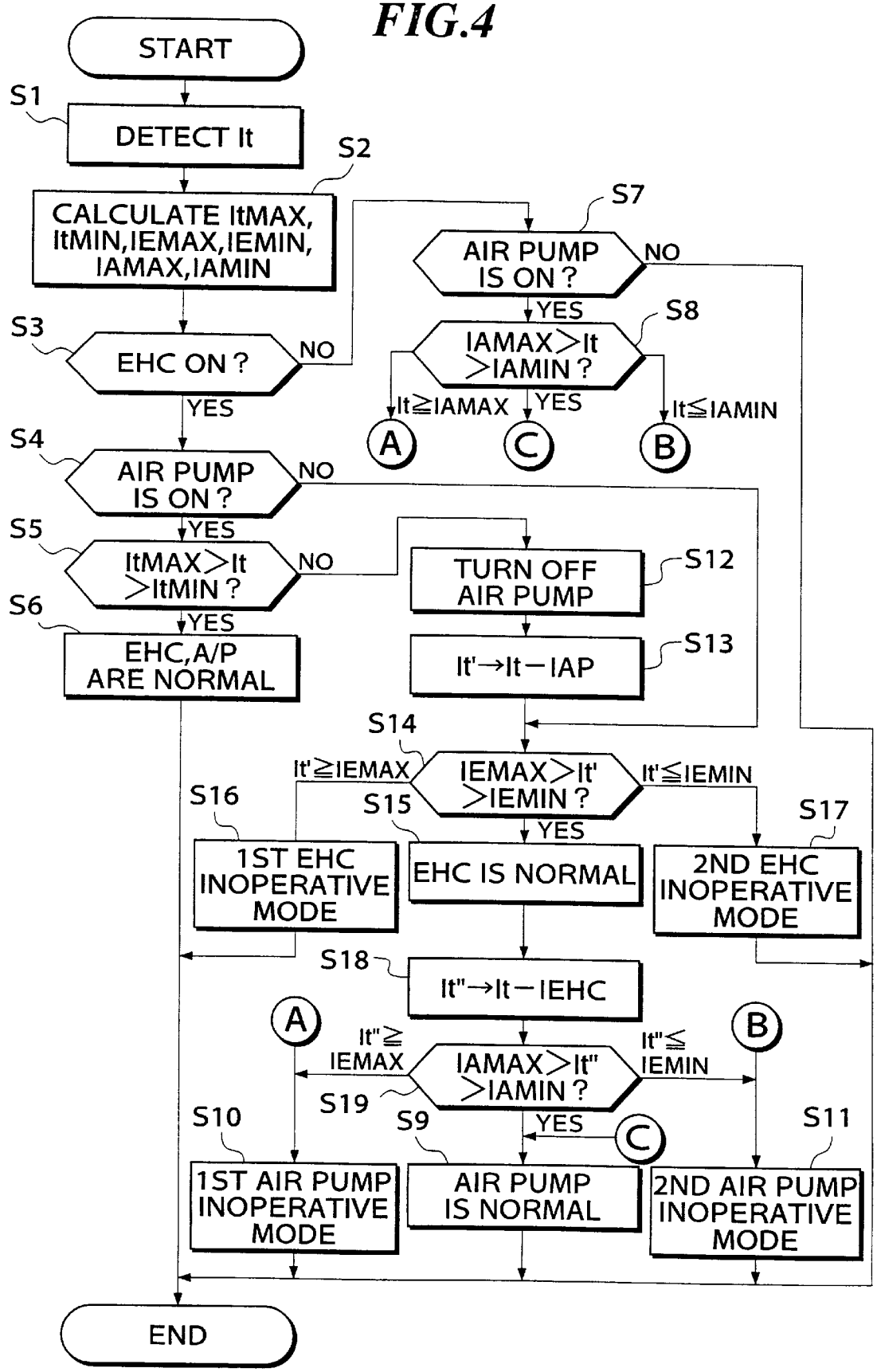

5,857,325

ELECTRICAL LOAD ABNORMALITY-DETECTING SYSTEM FOR AUTOMOTIVE VEHICLES

BACKGROUND OF THE INVENTION

1. Field of the Invention

This invention relates to an electrical load abnormality-detecting system for automotive vehicles, and more particularly to an electrical load abnormality-detecting system of this kind, which detects load currents flowing through a plurality of electrical load devices in an automotive vehicle by a common electric current-detecting means.

2. Prior Art

Conventionally, an electrical load abnormality-detecting system for automotive vehicles has been proposed e.g. by the present assignee in Japanese Patent Application No. 7-120648, which detects failure of an electrically-heated catalyzer (EHC) and an air pump, which are arranged in the exhaust system of an internal combustion engine, by monitoring voltage and current applied to and flowing through them. The monitoring of the voltage and current is carried out by monitoring output signals from current sensors provided respectively for the EHC and the air pump.

However, according to the proposed electrical load abnormality-detecting system, it is required to provide as many current sensors for electrical load devices to be detected as to abnormality, to detect current flowing therethrough. This results in an increase in the number of component parts of the vehicle, and thereby degrades the efficiency of space utilization and increases the manufacturing cost.

SUMMARY OF THE INVENTION

It is an object of the invention to provide an electrical load abnormality-detecting system for an automotive vehicle, which is capable of detecting abnormality of a plurality of electrical load devices by the use of a single current sensor.

To attain the above object, the invention provides an electrical load abnormality-detecting system for an automotive vehicle, comprising:

a plurality of electrical load devices installed on the automotive vehicle;

a current sensor provided commonly for the plurality of electrical load devices, for detecting a total load current flowing through the plurality of electrical load devices; and abnormality-detecting means for separately putting the plurality of electrical load devices into operation, and for determining abnormality of each of the plurality of electrical load devices based on the total load current detected by the current sensor.

Preferably, the abnormality-detecting means comprises setting means for setting a predetermined upper limit value and a predetermined lower limit value of the total load current to be detected by the current sensor in a manner corresponding to operative states in which the plurality of electrical load devices are set, and comparison means for comparing the total load current detected in the operative states in which the plurality of electrical load devices are set with the predetermined upper limit value and the predetermined lower limit value of the total load current, to determine whether the total load current falls within a range defined by the predetermined upper limit value and the predetermined lower limit value.

Preferably, the abnormality-detecting means comprises determining means for determining that the plurality of electrical load devices are each operating normally if the total load current detected by the current sensor falls within a range defined by a predetermined upper limit value and a predetermined lower limit value when the plurality of electrical load devices are all put into operation.

Preferably, the abnormality-detecting means comprises setting means for setting a predetermined upper limit value and a predetermined lower limit value of the total load current to be detected by the current sensor in a manner corresponding to each of the plurality of electrical load devices when the each of the plurality of electrical load devices is in operation, and comparison means for comparing the total load current detected when the each of the plurality of electrical load devices is in operation with the predetermined upper limit value and the predetermined lower limit value of the total load current, to determine whether the total load current falls within a range defined by the predetermined upper limit value and the predetermined lower limit value.

More preferably, the abnormality-detecting means comprises means for putting one of the plurality of electrical load devices into operation and stopping remaining at least one of the plurality of electrical load devices other than the one of the plurality of electrical load devices from operating when the total load current detected by the current sensor falls outside the range defined by the predetermined upper limit value and the predetermined lower limit value of the total load current, means for subtracting a predetermined value of current corresponding to the remaining at least one of the plurality of electrical load devices from the total load current detected by the current sensor to calculate a modified total load current, comparison means for comparing the modified total load current with a predetermined upper limit value and a predetermined lower limit value of the modified total load current corresponding to the one of the plurality of electrical load devices put into operation, and second determining means for determining that the one of the plurality of electrical load devices put into operation is operating normally if the modified total load current falls within a range defined by the predetermined upper limit value and the predetermined lower limit value of the modified total load current corresponding to the one of the plurality of electrical load devices put into operation.

Further preferably, the abnormality-detecting means comprises third determining means for determining that the one of the electrical load devices put into operation is in failure due to a short circuit when the modified total load current is larger than the predetermined upper limit value of the modified total load current corresponding to the one of the plurality of electrical load devices put into operation.

Further preferably, the abnormality-detecting means comprises fourth determining means for determining that the one of the electrical loads put into operation is in failure due to a disconnection when the modified total load current is smaller than the predetermined lower limit value of the modified total load current corresponding to the one of the plurality of electrical loads put into operation.

Further preferably, when the second determining means determines that the one of the plurality of electrical load devices is operating normally, the abnormality-detecting means puts one of the remaining at least one of the plurality of electrical load devices into operation, to determine whether the one of the remaining at least one of the plurality of electrical load devices is operating normally.

Preferably, the plurality of electrical load devices include a heater resistance of an electrically-heated catalyzer, and a driving motor of an air pump.

More preferably, the automotive vehicle has an internal combustion engine installed thereon, and the heater resistance of the electrically-heated catalyzer and the driving motor of the air pump is simultaneously put into operation after the internal combustion engine is started. One of the heater resistance of the electrically-heated catalyzer and the driving motor of the air pump is stopped from operating after a first predetermined time period has elapsed after the internal combustion engine is started, and the other of the heater resistance of the electrically-heated catalyzer and the driving motor of the air pump is stopped from operating after a second predetermined time period different form the first predetermined time period has elapsed.

Further preferably, the electrically-heated catalyzer is energized over a fixed time period.

Further preferably, the electrical load abnormality-detecting system includes means for detecting coolant temperature of the engine, and means for detecting temperature of intake air into the engine, and the electrically-heated catalyzer is energized over a time period set according to the coolant temperature of the engine detected and the temperature of intake air into the engine detected.

The above and other objects, features, and advantages of the invention will become more apparent from the following detailed description taken in conjunction with the accompanying drawings.

BRIEF DESCRIPTION OF THE DRAWINGS

FIGS. 3A to 3D collectively form a timing chart showing an example of control operations executed by the electrical load abnormality-detecting system according to the embodiment, in which;

FIG. 3A shows changes in the rotational speed of the engine after the start thereof with a reference value for determining complete explosion of the engine;

FIG. 3B shows changes in the operative state of the electrically-heated catalyzer;

FIG. 3C shows changes in the operative state of an air pump; and

FIG. 3D shows changes in a total current It as the sum of a current flowing through the electrically-heated catalyzer and a current flowing through the air pump; and FIG. 4 is a flowchart showing a program executed by the electrical load abnormality-detecting system according to the embodiment.

DETAILED DESCRIPTION

The invention will now be described in detail with reference to the drawings showing an embodiment thereof.

Figure 1:
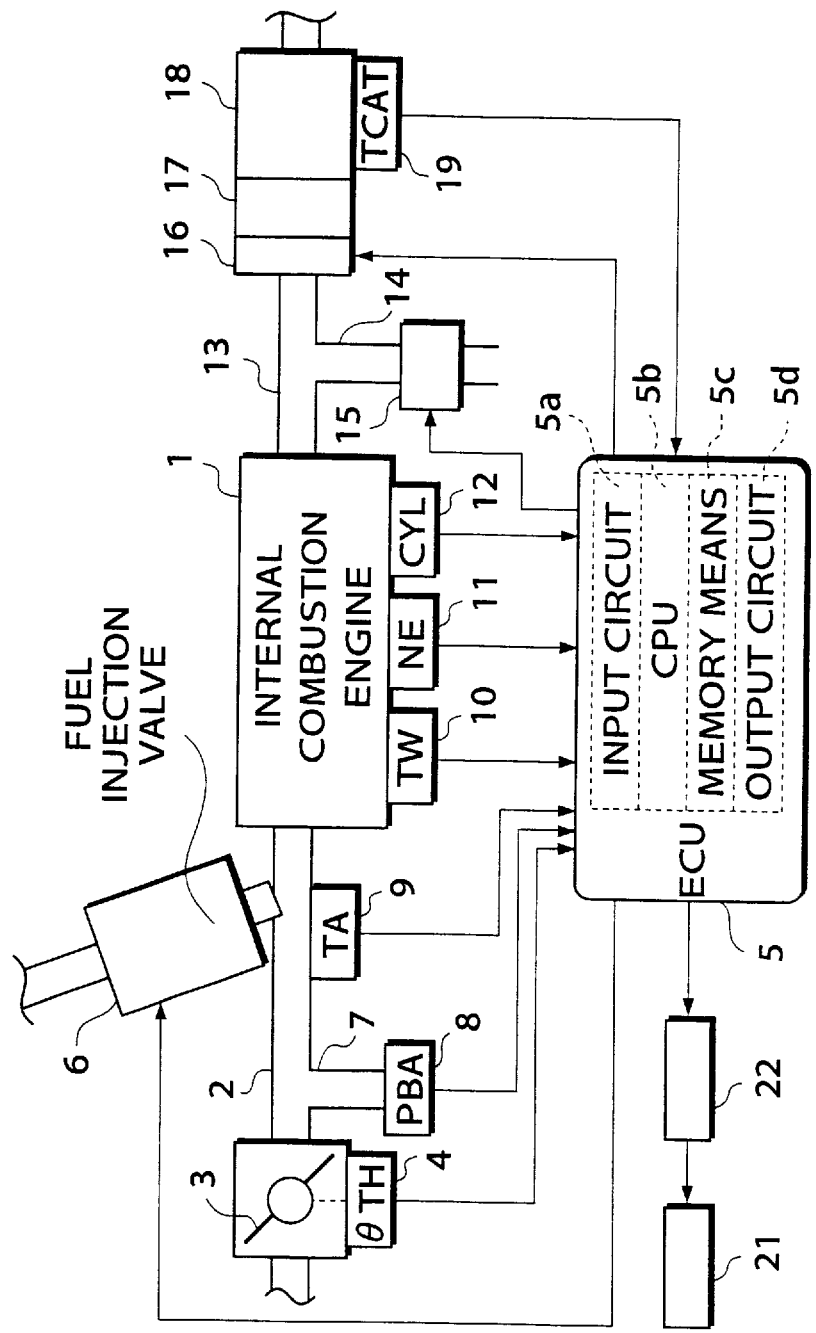
FIG. 1 is a block diagram showing the arrangement of an internal combustion engine and a control system therefor, including an electrical load abnormality-detecting system according to an embodiment of the invention.

Referring first to FIG. 1, there is shown the whole arrangement of an internal combustion engine (hereinafter simply referred to as "the engine") and a control system therefor. The control system incorporates an electrical load abnormality-detecting system according to an embodiment of the invention. Arranged in an intake pipe 2 of the engine 1 is a throttle valve 3 to which a throttle valve opening (θ TH) sensor 4 is connected for generating an electric signal indicative of the sensed valve opening θ TH and supplying the same to an electronic control unit (hereinafter referred to as "the ECU 5").

Fuel injection valves 6, only one of which is shown, are inserted into the intake valve 2 at locations intermediate between the throttle valve 3 and the cylinder block of the engine 1 and slightly upstream of respective intake valves. The fuel injection valves 6 are connected to a fuel pump, not shown, and electrically connected to the ECU 5 to have their valve opening periods controlled by signals therefrom.

An intake pipe absolute pressure (PBA) sensor 8 is provided in communication with the interior of the intake pipe 2 via a conduit 7 opening into the intake pipe 2 at a location slightly downstream of the throttle valve 3, for supplying an electric signal indicative of the sensed absolute pressure PBA within the intake pipe 2 to the ECU 5. Further, an intake air temperature (TA) sensor 9 is inserted into the intake pipe 2 at a location downstream of the conduit 7 for supplying an electric signal indicative of the sensed intake air temperature TA to the ECU 5.

An engine coolant temperature (TW) sensor 10 formed of a thermistor or the like is mounted in the cylinder block of the engine 1 filled with an engine coolant, for supplying an electric signal indicative of the sensed engine coolant temperature TW to the ECU 5.

An engine rotational speed (NE) sensor 11 and a cylinder-discriminating (CYL) sensor 12 are arranged in facing relation to a camshaft or a crankshaft of the engine 1, neither of which is shown. The engine rotational speed sensor 11 generates a pulse (hereinafter referred to as "the TDC signal pulse") at a predetermined crank angle position of each cylinder of the engine a predetermined angle before a TDC position of the cylinder corresponding to the start of the intake stroke thereof (whenever the crankshaft rotates through 180 degrees in the case of a four-cylinder engine). The cylinder-discriminating sensor 12 generates a pulse (hereinafter referred to as "the CYL signal pulse") at a predetermined crank angle position of a particular cylinder a predetermined angle before the start of the intake stroke thereof. The TDC signal pulse and the CYL signal pulse are supplied to the ECU 5.

An electrically-heated catalyzer (hereinafter referred to as "the EHC") 16, a starting catalyst 17, and a three-way catalyst 18 are arranged in an exhaust pipe 13 connected to the engine 1 in this order from an upstream side thereof, for purifying noxious components, such as HC, CO, NOx, which are present in exhaust gases from the engine. The starting catalyst 17 is a small-sized catalyzer provided mainly for purifying exhaust gases emitted from the engine immediately after the start thereof.

Further, a passage 14 is connected to the exhaust pipe 13 at a location upstream of the EHC 16, through which a secondary air is introduced into the exhaust pipe 13. An air pump 15 is arranged in the passage 14.

The EHC 16 and the air pump 15 are electrically connected to the ECU 5 to have their operations controlled by control signals therefrom. The three-way catalyst 18 is provided with a catalyst temperature sensor 19, which detects the temperature (catalyst temperature) TCAT of the three-way catalyst and supplies a signal indicative of the sensed catalyst temperature TCAT to the ECU 5.

Further, an alternator 21, which is driven by the engine 1, is electrically connected to the ECU 5 via a regulator 22 to have an output voltage thereof controlled by a signal from the ECU 5.

The ECU 5 is comprised of an input circuit 5a having the functions of shaping the waveforms of input signals from various sensors, shifting the voltage levels of sensor output signals to a predetermined level, converting analog signals from analog-output sensors to digital signals, and so forth, a central processing unit (hereinafter referred to as "the CPU") 5b, a memory device 5c storing various operational programs which are executed by the CPU 5b, referred to hereinafter, and results of calculations therefrom, etc., and an output circuit 5d which outputs control signals to the fuel injection valves 6, the air pump 15, the EHC 16, the regulator 22, etc.

The CPU 5b operates in response to the above-mentioned signals from the various sensors to calculate an energization time period TON over which the EHC 16 is energized and a supply voltage VHEC to be applied to the EHC 16, as described hereinafter, and deliver control signals based on results of the calculations.

Figure 2:
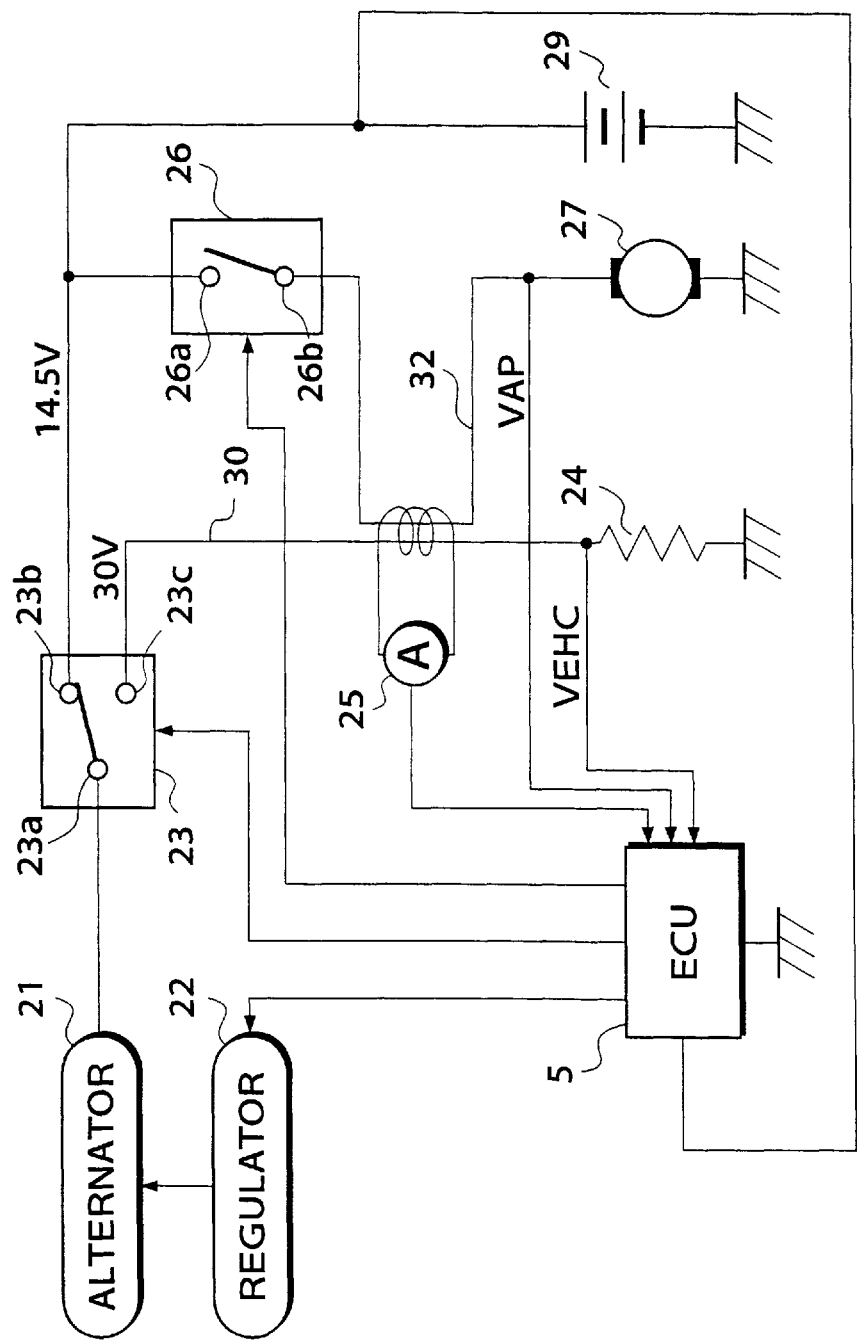
FIG. 2 is a circuit diagram showing electrical connections between electrical components, such as an electrically-heated catalyzer as a heater resistance.

FIG. 2 shows electrical connections between the ECU 5, the alternator 21, the regulator 22, a heater resistance 24 of the EHC 16, a driving motor 27 of the air pump 15, and a battery 29. The EHC 16 employed in the present embodiment functions as a heater as well such that it has a catalyst body thereof supplied with current to be heated thereby. The electrical resistance of the catalyst body is represented as the heater resistance 24.

The alternator 21 has an output thereof connected to a terminal 23a of a changeover switch 23 which has another terminal 23c connected to one end of the heater resistance 24 via a connecting line 30. The other end of the heater resistance 24 is grounded.

The changeover switch 23 also has a further terminal 23b connected to a positive electrode of the battery 29 as well as to a terminal 26a of an ON-OFF switch 26. The ON-OFF switch 26 has another terminal 26b connected to one end of the motor 27 via a connecting line 32. The other end of the motor 27 is grounded.

When the terminal 23b is selected by the changeover switch 23, the ECU 5 controls the regulator 22 such that it generates an alternating current having an output voltage of 14.5V. On the other hand, when the terminal 23c is selected by the changeover switch 23, the ECU 5 controls the regulator 22 such that it generates an alternating current having an output voltage of 30V.

The connecting lines 30 and 32 are bound together to form a bundle portion, at which a current sensor 25 is provided for detecting a total current It, i.e. the sum of a current flowing through the connecting line 30 (heater current IEHC) and a current flowing through the connecting line 32 (pump current IAP). The battery 29 has its negative electrode grounded and its positive electrode connected to the ECU 5.

The changeover switch 23 and the ON-OFF switch 26 are connected to the ECU 5 such that they can be changed over in their operative states by respective control signals therefrom. The changeover switch 23 is normally in a position shown in FIG. 2 in which the terminals 23a and 23b are connected to each other, while the ON-OFF switch 26 is normally open (OFF). The switches 23 and 26 are controlled to be changed in position from their illustrated positions immediately after the start of the engine if required. The connecting lines 30 and 32 are connected to the ECU 5 so that the ECU 5 detects the EHC voltage VEHC and a pump voltage VAP applied to the driving motor 27 of the air pump 15. Further, the current sensor 25 is connected to the ECU 5 to supply a signal indicative of the sensed current to the same. In the present embodiment, the current sensor 25 is utilized to detect abnormality, e.g. disconnections of the EHC 16, the motor 27 of the air pump 15 and their related wiring.

FIG. 3 shows an example of control operations executed by the electrical load abnormality-detecting system according to the present embodiment.

Figure 3A:
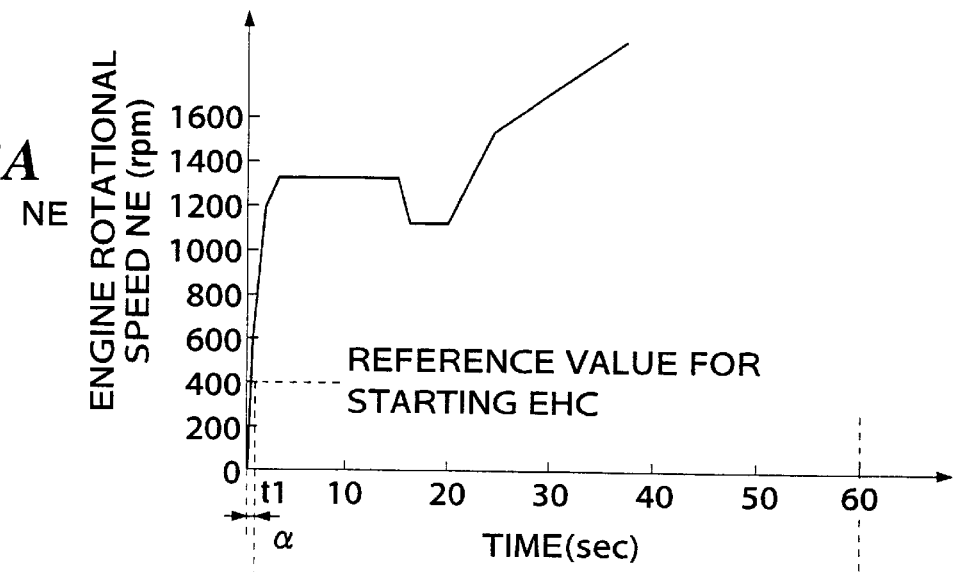
Figure 3B:
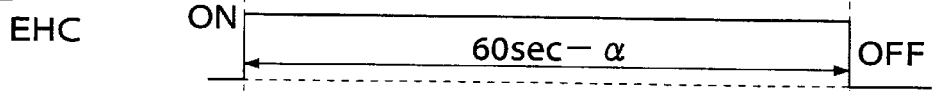

When the engine is started and the engine rotational speed NE reaches a predetermined reference value NEK for determining complete explosion of the engine (time point t1), the ECU 5 determines that complete explosion has taken place in the engine (see FIG. 3A) and then delivers a control signal to the switch 23 to change its position from one in which the terminal 23a is connected to the terminal 23b to one in which it is connected to the terminal 23c (see FIG. 3B). At the same time, the ECU 5 delivers a control signal to the switch 26 to close the same (see FIG. 3C). As a result, the EHC 16 and the air pump 15 start operating. At this time, the heater current IEHC is approximately 84 A, and the pump current IAP is approximately 18 A. Therefore, the total current It of the heater current IEHC and the pump current IAP is approximately 102 A.

Figure 3C:
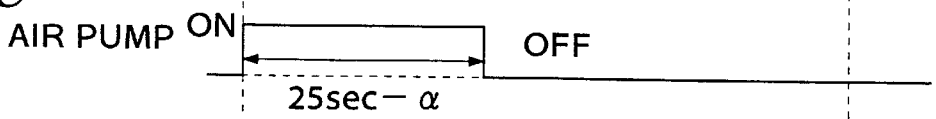
Figure 3D:
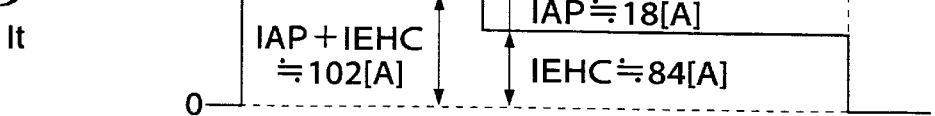

When a first predetermined time period (e.g. 25 seconds) has elapsed after the start of the engine, the ECU 5 delivers a control signal to the switch 26 to open the same to thereby stop the air pump 15 from operating (see FIG. 3C). Further, when a second predetermined time period (e.g. 60 seconds) has elapsed after the start of the engine, the ECU 5 delivers a control signal to the switch 23 to change its position from the position in which the terminals 23a and 23c are connected together to the position in which the terminals 23a and 23b are connected together (see FIG. 3B), to thereby stop the EHC 16 from operating (see FIG. 3B). Accordingly the total current It changes as shown in FIG. 3D.

FIG. 4 shows a program for controlling power supply to the heater resistance 24 and the motor 27. This processing is executed at predetermined time intervals.

First, at a step S1, the total current It of the heater current IEHC and the pump current IAP is detected by the current sensor 25. Then, at a step S2, reference values for determining respectively the maximum total current value ItMAX, the minimum total current value ItMAX, the maximum heater current value IEMAX, the minimum heater current value IEMIN, the maximum pump current value IAMAX, and the minimum pump current value IAMIN are determined based on predetermined table values retrieved from respective tables.

At the following step S3, it is determined whether or not the EHC 16 is in an energized state (ON). This determination is made based on whether or not the second predetermined time period has elapsed after the start of the engine. If the EHC 16 is ON, it is determined at a step S4 whether or not the air pump 15 is in an energized state (ON). This determination is made based on whether or not the first predetermined time period has elapsed after the start of the engine. If it is determined at the step S4 that the air pump 15 is ON, it is determined at a step 5 whether or not the total current It is larger than the minimum total current value ItMIN and at the same time smaller than the maximum total current value ItMAX. If ItMAX>It>ItMIN holds, it is determined at a step S6 that the EHC 16 and the air pump 15 are both operating normally, followed by terminating the program.

If it is determined at the step S3 that the EHC 16 is not ON, the program proceeds to a step S7, wherein it is determined whether or not the air pump 15 is ON. If the air pump 15 is ON, it is determined at a step 8 whether or not the total current It is larger than the minimum pump current value IAMIN and at the same time smaller than the maximum pump current value IAMAX. If IAMAX>It>IAMIN holds, it is determined at a step S9 that the air pump 15 is operating normally, followed by terminating the program.

If it is determined at the step S7 that the air pump 15 is not ON, the program is immediately terminated.

If it is determined at the step S8 that the total current It is equal to or larger than the maximum pump current value IAMAX, it is determined at a step S10 that the air pump 15 is in failure in a first air pump inoperative mode (due to a short circuit or locking of an impeller of the pump), followed by terminating the program. Further, if it is determined at the step S8 that the total current It is equal to or smaller than the minimum pump current value IAMIN, it is determined at a step S11 that the air pump 15 is in failure in a second air pump inoperative mode (due to a disconnection), followed by terminating the program.

If it is determined at the step S5 that the total current It is equal to or larger than the maximum total current value ItMAX or if the total current It is equal to or smaller than the minimum total current value ItMIN, i.e. if It≧ItMAX or It≦ItMIN holds, the program proceeds to a step S12, wherein the air pump 15 is deenergized or turned off. Then, at a step S13, the pump current IAP is subtracted from the total current It to calculate a first substitute value It' for the total current It. The pump current IAP is a table value or a fixed value of current which should flow through the air pump 15 if it is in operation.

At the following step S14, it is determined whether or not the first substitute value It' is larger than the minimum heater current value IEMIN and at the same time smaller than the maximum heater current value IEMAX. If IEMAX<It'<IEMIN holds, it is determined at a step S15 that the EHC 16 is operating normally. If It'≧IEMAX holds at the step S14, it is determined at a step S16 that the EHC 16 is in failure in a first EHC inoperative mode (due to a short circuit), followed by terminating the program. On the other hand, if It'≦IEMIN holds at the step S14, it is determined at a step S17 that the EHC 16 is in failure in a second EHC inoperative mode (due to a disconnection), followed by terminating the program.

From the step S15, the program proceeds to a step S18, wherein the heater current IEHC is subtracted from the total current It to calculate a second substitute value It" for the total current It. The heater current IEHC is a table value or a fixed value of current which should flow through the EHC 16 if it is in operation.

Then, it is determined at a step S19 whether or not the second substitute value It" is larger than the minimum pump current value IAMIN and at the same time smaller than the maximum heater current value IAMAX. If IAMIN<It"<IAMAX holds at the step S19, the program proceeds to the step S9, wherein the air pump 15 is operating normally. If It"≧IAMAX holds at the step S19, the program proceeds to the step S10, wherein it is determined that the air pump 15 is in failure in the first air pump inoperative mode, followed by terminating the program. If It"≦IAMIN holds at the step S19, the program proceeds to the step S11, wherein the air pump 15 is in failure in the second air pump inoperative mode, followed by terminating the program.

According to the embodiment described above, it is possible to detect both abnormality of the air pump 15 and abnormality of the EHC 16 by means of the single current sensor 25.

In the present embodiment, the motor 27 of the air pump 15 is put into operation at the same time that the EHC 16 is put into operation. However, since they are energized over respective different time periods after the start of the engine, it can be deemed that they are operated at different timings from each other.

Although in the embodiment described above, the energization time period over which the EHC 16 is energized is set to a fixed time period, this is not limitative, but the energization time period may be set according to the engine coolant temperature TW and the intake air temperature TA. The voltage VEHC applied to the EHC 16 may be also set according to the engine coolant temperature TW and the intake air temperature TA. Further, the catalyst temperature TACT detected by the catalyst temperature sensor 19 may be employed to set the EHC voltage VEHC and the energization time period TON. The EHC voltage VEHC and the energization time period TON may also be set according to one or two of the engine coolant temperature TW, the intake air temperature TA and the catalyst temperature TCAT. Still further, a parameter representative of the temperature of the exhaust system, such as the exhaust gas temperature, may be used instead of the catalyst temperature TCAT.

Although in the embodiment described above, the EHC 16 and the driving motor 27 of the air pump 15 are employed as electrical load devices of an automotive vehicle, this is not limitative, but the invention may be applied to detect abnormality in other electrical load devices such as electrical equipment and accessories.

What is claimed is:

1. An electrical load abnormality-detecting system for an automotive vehicle, comprising:

a plurality of electrical load devices installed on said automotive vehicle;

a current sensor provided commonly for said plurality of electrical load devices, for detecting a total load current flowing through said plurality of electrical load devices; and abnormality-detecting means for separately putting said plurality of electrical load devices into operation, and for determining abnormality of each of said plurality of electrical load devices based on said total load current detected by said current sensor, wherein said abnormality-detecting means comprises determining means for determining that said plurality of electrical load devices are each operating normally if said total load current detected by said current sensor falls within a range defined by a predetermined upper limit value and a predetermined lower limit value when said plurality of electrical load devices are all put into operation, wherein said abnormality-detecting means further comprises means for putting one of said plurality of electrical load devices into operation and stopping remaining at least one of said plurality of electrical load devices other than said one of said plurality of electrical load devices from operating when said total load current detected by said current sensor falls outside said range defined by said predetermined upper limit value and said predetermined lower limit value of said total load current, means for subtracting a predetermined value of current corresponding to said remaining at least one of said plurality of electrical load devices from said total load current detected by said current sensor to calculate a modified total load current, comparison means for comparing said modified total load current with a predetermined upper limit value and a predetermined lower limit value of said modified total load current corresponding to said one of said plurality of electrical load devices put into operation, and second determining means for determining that said one of said plurality of electrical load devices put into operation is operating normally if said modified total load current falls within a range defined by said predetermined upper limit value and said predetermined lower limit value of said modified total load current corresponding to said one of said plurality of electrical load devices put into operation.

2. An electrical load abnormality-detecting system according to claim 1, wherein said abnormality-detecting means comprises third determining means for determining that said one of said electrical load devices put into operation is in failure due to a short circuit when said modified total load current is larger than said predetermined upper limit value of said modified total load current corresponding to said one of said plurality of electrical load devices put into operation.

3. An electrical load abnormality-detecting system according to claim 1, wherein said abnormality-detecting means comprises fourth determining means for determining that said one of said electrical loads put into operation is in failure due to a disconnection when said modified total load current is smaller than said predetermined lower limit value of said modified total load current corresponding to said one of said plurality of electrical loads put into operation.

4. An electrical load abnormality-detecting system according to claim 1, wherein when said second determining means determines that said one of said plurality of electrical load devices is operating normally, said abnormality-detecting means puts one of said remaining at least one of said plurality of electrical load devices into operation, to determine whether said one of said remaining at least one of said plurality of electrical load devices is operating normally.

5. An electrical load abnormality-detecting system for an automotive vehicle comprising:

a plurality of electrical load devices installed on said automotive vehicle;

a current sensor provided commonly for said plurality of electrical load devices, for detecting a total load current flowing through said plurality of electrical load devices; and abnormality-detecting means for separately putting said plurality of electrical load devices into operation, and for determining abnormality of each of said plurality of electrical load devices based on said total load current detected by said current sensor, wherein said abnormality-detecting means comprises setting means for setting a predetermined upper limit value and a predetermined lower limit value of said total load current to be detected by said current sensor in a manner corresponding to operative states in which said plurality of electrical load devices are set, and comparison means for comparing said total load current detected in said operative states in which said plurality of electrical load devices are set with said predetermined upper limit value and said predetermined lower limit value of said total load current, to determine whether said total load current falls within a range defined by said predetermined upper limit value and said predetermined lower limit value, wherein said plurality of electrical load devices include a heater resistance of an electrically-heated catalyzer, and a driving motor of an air pump, wherein said automotive vehicle has an internal combustion engine installed thereon, said heater resistance of said electrically-heated catalyzer and said driving motor of said air pump being simultaneously put into operation after said internal combustion engine is started, one of said heater resistance of said electrically-heated catalyzer and said driving motor of said air pump being stopped from operating after a first predetermined time period has elapsed after said internal combustion engine is started, the other of said heater resistance of said electrically-heated catalyzer and said driving motor of said air pump being stopped from operating after a second predetermined time period different from said first predetermined time period has elapsed.

6. An electrical load abnormality-detecting system according to claim 5, wherein said electrically-heated catalyzer is energized over a fixed time period.

7. An electrical load abnormality-detecting system according to claim 5, including means for detecting coolant temperature of said engine, and means for detecting temperature of intake air into said engine, and wherein said electrically-heated catalyzer is energized over a time period set according to said coolant temperature of said engine detected and said temperature of intake air into said engine detected.

* * * * *